United States Patent
Schlereth

(10) Patent No.: US 11,658,531 B2
(45) Date of Patent: May 23, 2023

(54) ROTOR FOR AN ELECTRICAL MACHINE WITH IMPROVED AXIAL SECURING OF THE ROTOR LAMINATED CORE, AND ELECTRICAL MACHINE AND VEHICLE COMPRISING SUCH A ROTOR

(71) Applicant: Valeo Siemens eAutomotive Germany GmbH, Erlangen (DE)

(72) Inventor: Alexander Schlereth, Bad Neustadt a.d.Saale (DE)

(73) Assignee: Valeo Siemens eAutomotive Germany GmbH, Erlangen (DE)

(*) Notice: Subject to any disclaimer, the term of this patent is extended or adjusted under 35 U.S.C. 154(b) by 44 days.

(21) Appl. No.: 17/363,879

(22) Filed: Jun. 30, 2021

(65) Prior Publication Data

US 2021/0408853 A1 Dec. 30, 2021

(30) Foreign Application Priority Data

Jun. 30, 2020 (DE) ...................... 10 2020 117 219.2

(51) Int. Cl.
*H02K 1/30* (2006.01)
*H02K 7/08* (2006.01)

(52) U.S. Cl.
CPC ............... *H02K 1/30* (2013.01); *H02K 7/083* (2013.01)

(58) Field of Classification Search
CPC .................................. H02K 1/30; H02K 7/083
USPC ............................................................. 310/90
See application file for complete search history.

(56) References Cited

U.S. PATENT DOCUMENTS

| 2,421,115 A | 5/1947 | Carlson |
| 2010/0247229 A1 | 9/2010 | Kaiser et al. |

FOREIGN PATENT DOCUMENTS

| CN | 201789349 U | 4/2011 |
| CN | 206077188 U | 4/2017 |
| CN | 207939279 U | 10/2018 |
| CN | 109888969 A | 6/2019 |
| JP | S60183548 U | 12/1985 |

OTHER PUBLICATIONS

Extended European Search Report in corresponding European Application No. 21173584.0, dated Oct. 26, 2021 (9 pages).
German Search Report in corresponding German Application No. 10 2020 117 219.2, dated Feb. 12, 2021 (40 pages).
Norm DIN 471 2011-04-00. Sicherungsringe (Halteringe) für Wellen—Regelausführung und schwere Ausführung (25 pages).

*Primary Examiner* — Terrance L Kenerly
(74) *Attorney, Agent, or Firm* — Osha Bergman Watanabe & Burton LLP

(57) ABSTRACT

The invention specifies a rotor (1, 1a ... 1f) for an electrical machine (14), which rotor comprises a rotor shaft (2, 2a ... 2f), a rotor laminated core (3), which sits on the rotor shaft (2, 2a ... 2f) with a press fit, a first rotor holder (5a ... 5c), which is arranged adjacent to the rotor laminated core (3) on a first side thereof, and a second rotor holder (6a ... 6d), which is arranged adjacent to the rotor laminated core (3) on a second, opposite side thereof. Furthermore, the rotor comprises a first shaft securing ring (7), which sits in a first groove of the rotor shaft (2, 2a ... 2f) and axially secures the rotor laminated core (3). In addition, the invention specifies an electrical machine comprising a stator (15) and a rotor (1, 1a ... 1f) of said type, and a vehicle (16) with at least two axles, at least one of which is driven. The driving of the vehicle (16) is performed at least partially or tempo- (Continued)

rarily by the electrical machine (14) of the abovementioned type.

9 Claims, 4 Drawing Sheets

ROTOR FOR AN ELECTRICAL MACHINE WITH IMPROVED AXIAL SECURING OF THE ROTOR LAMINATED CORE, AND ELECTRICAL MACHINE AND VEHICLE COMPRISING SUCH A ROTOR

TECHNICAL FIELD

The invention relates to a rotor for an electrical machine, which rotor comprises a rotor shaft, a rotor laminated core, which sits on the rotor shaft with a press fit (and has a plurality of rotor laminations), a first rotor holder, which is arranged adjacent to the rotor laminated core on a first side thereof, and a second rotor holder, which is arranged adjacent to the rotor laminated core on a second, opposite side thereof. Furthermore, the invention relates to an electrical machine comprising a stator and a rotor of the abovementioned type, which rotor is mounted such that it can rotate about the rotation axis of the rotor in relation to the stator. Finally, the invention relates to a vehicle with at least two axles, at least one of which is driven, wherein said driving is performed at least partially or temporarily by the electrical machine of the abovementioned type.

PRIOR ART

When mounting the rotor laminated core on the rotor shaft, the rotor laminations are pressed onto one another by a pressing device, so that no air gaps or only small air gaps are produced between the rotor laminations as far as possible. On account of inevitable deviations from the planar shape, the rotor laminations act as a spring pack. Fanning out is counteracted by appropriate selection of the press fit of the rotor laminated core on the rotor shaft. Nevertheless, fanning out of the rotor laminated core or movement of the rotor laminations away from one another may occur during operation of the electrical machine over the course of time.

DISCLOSURE OF THE INVENTION

One object of the invention is therefore to specify an improved rotor, an improved electrical machine, and an improved vehicle. A particular aim is to effectively prevent fanning out of the rotor laminated core or movement of the rotor laminations away from one another (as occurs particularly during operation of the electrical machine).

The object of the invention is achieved by a rotor of the abovementioned type, which rotor comprises a first shaft securing ring, which sits in a first groove of the rotor shaft and axially secures the rotor laminated core.

The object of the invention is also achieved by an electrical machine comprising a stator and a rotor of the abovementioned type, wherein the rotor is mounted such that it can rotate about the rotation axis of the rotor in relation to the stator.

Finally, the object of the invention is achieved by a vehicle with at least two axles, wherein at least one of the axles is driven and wherein said driving is performed at least partially or temporarily by the electrical machine of the abovementioned type.

With the aid of the proposed measures, fanning out of the rotor laminated core or movement of the rotor laminations away from one another can be effectively avoided. In the process, the two rotor holders serve to dissipate too the axial forces away from external radial regions, in which the shaft securing rings alone would have had no effect. In general, the shaft securing rings are selected such that they firstly can absorb the axial forces produced and secondly do not lift off, or do not become detached, at the rated speed of the electrical machine. For example, the shaft securing ring can be designed in accordance with DIN 471.

The rotor holders are only slightly limited in respect of their shape, provided that they extend far to the outside of the rotor laminated core. In the given context, the term "far to the outside" can be understood to mean, in particular, that the greatest diameter, on which the first or the second rotor holder touches the rotor laminated core, is at least 0.7 times the outside diameter of the rotor laminated core. In particular, the rotor holders can be disc-like, wheel-like (with spokes) or star-like.

It is expedient when the rotor has a second shaft securing ring, which sits in a second groove of the rotor shaft and axially secures the rotor laminated core, wherein the second groove is arranged opposite the first groove with respect to the rotor laminated core. In this way, the laminated core is axially secured on both sides by shaft securing rings. However, it is also conceivable for the rotor to have a shaft shoulder on the rotor shaft, which shaft shoulder axially secures the rotor laminated core. In this way, the rotor laminated core is axially secured on one side by the shaft shoulder and the other side by the first shaft securing ring.

In particular, the first shaft securing ring and the first groove can be arranged adjacent to the first rotor holder opposite the rotor laminated core and/or the second shaft securing ring and the second groove can be arranged adjacent to the second rotor holder opposite the rotor laminated core. The shaft shoulder can also be arranged adjacent to the first rotor holder or adjacent to the second rotor holder.

Further advantageous refinements and developments of the invention can be found in the dependent claims and in the description when looked at together with the figures.

It is advantageous when the first shaft securing ring and/or the second shaft securing ring are/is arranged on a shaft projection of the rotor shaft. At very high speeds of the electrical machine, the shaft securing rings may lift off or become detached from the shaft diameter of the rotor shaft, on which shaft diameter the rotor laminated core sits. For this reason, it may be expedient to arrange the shaft securing rings on a shaft projection of the rotor shaft with a smaller diameter. The lift-off speed is raised owing to this measure.

In addition, it is advantageous when the rotor has a first (rotary) bearing, the inner ring of which is arranged adjacent to the first rotor holder opposite the rotor laminated core, wherein the first shaft securing ring is arranged on the outside of the inner ring of the first bearing. Furthermore, it is advantageous when the rotor has a second (rotary) bearing, the inner ring of which is arranged adjacent to the second rotor holder opposite the rotor laminated core, wherein the second shaft securing ring is arranged on the outside of the inner ring of the second bearing and wherein the second bearing is arranged opposite the first bearing with respect to the rotor laminated core. With this design, the inner ring of the first bearing and/or the inner ring of the second bearing are/is axially secured together with the rotor laminated core. A multiple function is achieved in this way. Firstly, both the rotor laminated core and the bearings are axially secured, and secondly the shaft securing rings sit on relatively small diameters, as a result of which the lift-off speed of said shaft securing rings is raised. This design is also particularly compact. Since the inner rings of the bearings are axially fixed with this design, a floating bearing which may be required can be implemented by means of the outer ring of one of the bearings. In general, the bearings can be designed as rolling bearings or sliding bearings.

It is also expedient when a first spacer disc or spacer sleeve is arranged between the inner ring of the first bearing and the first rotor holder, and/or a second spacer disc or spacer sleeve is arranged between the inner ring of the second bearing and the second rotor holder. As a result, the outer rings of the bearings can rotate freely and do not brush against the rotor holders if these do not have any corresponding projections or clearances.

The above refinements and developments of the invention can be combined in any desired manner.

BRIEF DESCRIPTION OF THE FIGURES

The present invention will be explained in more detail below with reference to the exemplary embodiment specified in the schematic figure of the drawing, in which.

DETAILED DESCRIPTION OF THE INVENTION

It is firstly stated that, in the variously described exemplary embodiments, parts that are the same are provided with the same reference signs or with the same component designations, possibly with different indices. The disclosures of a component contained in the description can be applied analogously to another component with the same reference sign or the same component designation. Also, the terms chosen in the description for indicating positions, such as, for example, "top", "bottom", "behind", "in front", "to the side" and so on, refer to the figure directly being described and shown and, when there is a change in position, can be applied analogously to the new position.

Figure 1:
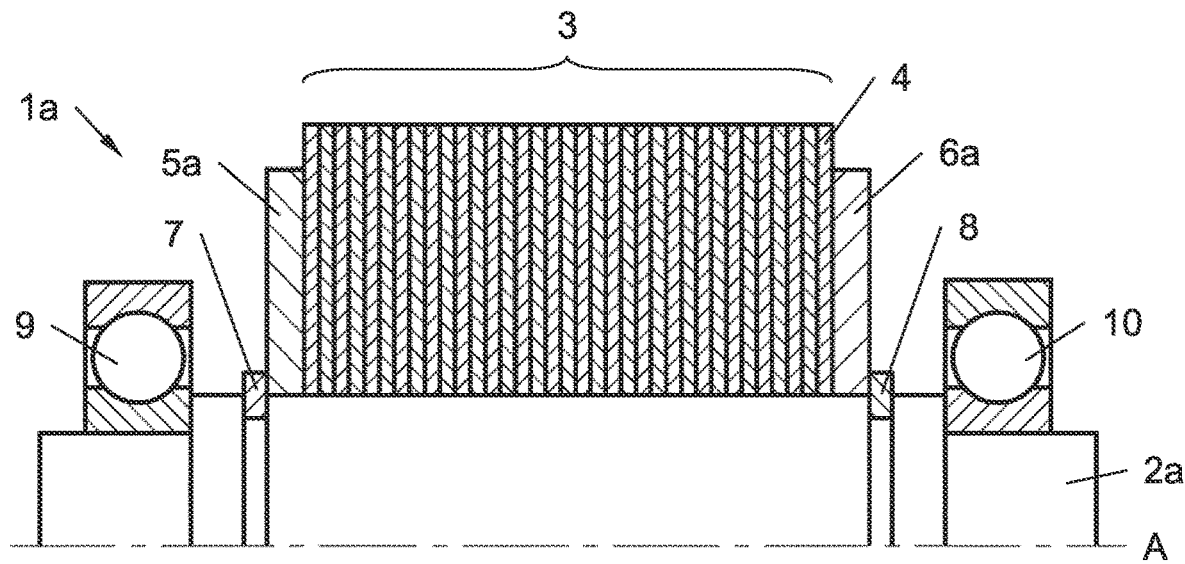
FIG. 1 shows a rotor for an electrical machine, in which rotor the rotor laminated core is axially secured by two shaft securing rings.

FIG. 1 shows a rotor 1a for an electrical machine, which comprises a rotor shaft 2a, a rotor laminated core 3, which comprises a large number of rotor laminations 4 and sits on the rotor shaft 2a with a press fit, and a first rotor holder 5a, which is arranged adjacent to the rotor laminated core 3 on a first side thereof, and a second rotor holder 6a, which is arranged adjacent to the rotor laminated core 3 on a second, opposite side thereof.

Furthermore, the rotor 1a comprises a first shaft securing ring 7, which sits in a first groove of the rotor shaft 2a and axially secures the rotor laminated core 3, and a second shaft securing ring 8, which sits in a second groove of the rotor shaft 2a and axially secures the rotor laminated core 3, wherein the second groove is arranged opposite the first groove with respect to the rotor laminated core 3.

When mounting the rotor laminated core 3 on the rotor shaft 2a, the rotor laminations 4 are pressed onto one another by a pressing device, so that no air gaps or only small air gaps are produced between the rotor laminations 3 as far as possible. On account of inevitable deviations from the planar shape, the rotor laminations 4 act as a spring pack. Fanning out is counteracted by appropriate selection of the press fit of the rotor laminated core 3 on the rotor shaft 2a. Nevertheless, fanning out of the rotor laminated core 3 or movement of the rotor laminations 4 away from one another may occur during operation of the electrical machine over the course of time. In order to prevent this, the proposed rotor 1a has the first rotor holder 5a, which is axially secured to the first shaft securing ring 7, and the second rotor holder 6a, which is axially secured to the second shaft securing ring 8. Therefore, fanning out of the rotor laminated core 3 or movement of the rotor laminations 4 away from one another can be effectively avoided. In the process, the two rotor holders 5a, 6a also serve to dissipate the axial forces away from external radial regions, in which the shaft securing rings 7, 8 alone would have no effect. In general, the shaft securing rings 7, 8 are selected such that they firstly can absorb the axial forces produced and secondly do not lift off, or do not become detached, at the rated speed of the electrical machine. In the case of the rotor 1a illustrated in FIG. 1, the first shaft securing ring 7 and the first groove are arranged adjacent to the first rotor holder 5a opposite the rotor laminated core 3, and the second shaft securing ring 8 and the second groove are arranged adjacent to the second rotor holder 6a opposite the rotor laminated core 3. However, this is not a necessary condition (also compare FIGS. 5 and 6). Furthermore, the rotor 1a comprises two rolling bearings 9, 10 which sit on shaft projections of the rotor shaft 2a and serve to rotatably mount the rotor 1a in a stator of the electrical machine (also see FIG. 8). Instead of the rolling bearings 9, 10, sliding bearings can also be used in principle in this example and in all the following examples.

Figure 2:
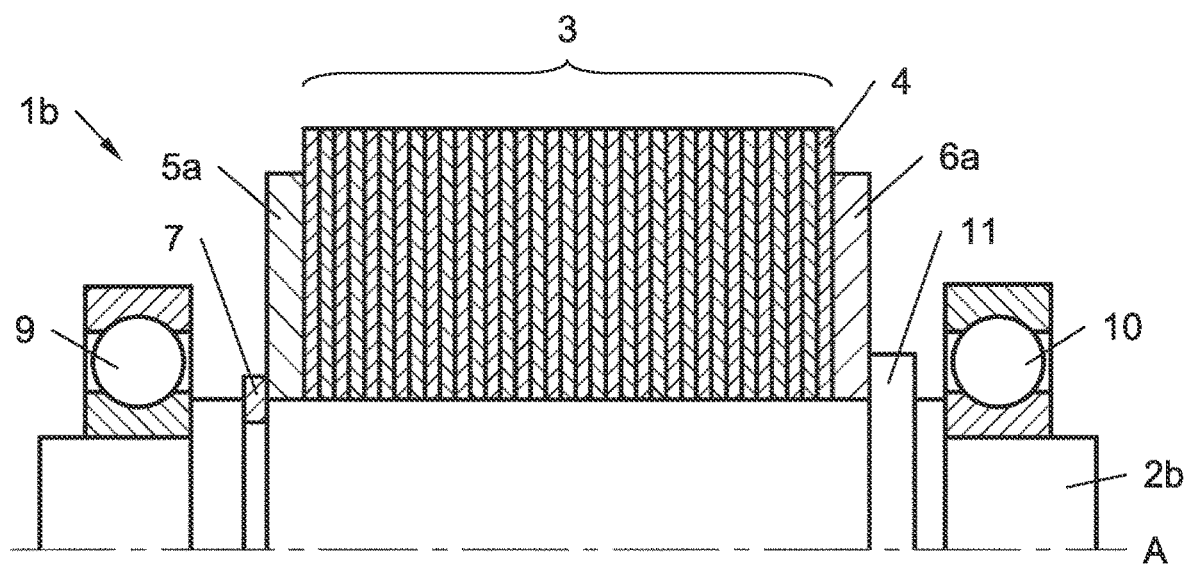
FIG. 2 shows a rotor for an electrical machine, in which rotor the rotor laminated core is axially secured by a shaft securing ring and a shaft shoulder of the rotor shaft.

FIG. 2 shows a slightly modified rotor 1b which is very similar to the rotor 1a shown in FIG. 1 and differs in that, instead of the second shaft securing ring 8, a shaft shoulder 11, on which the second rotor holder 6a is supported, is provided. The shaft shoulder 11 is arranged on the rotor 2b adjacent to the second rotor holder 6a and opposite the rotor laminated core 3.

Figure 3:
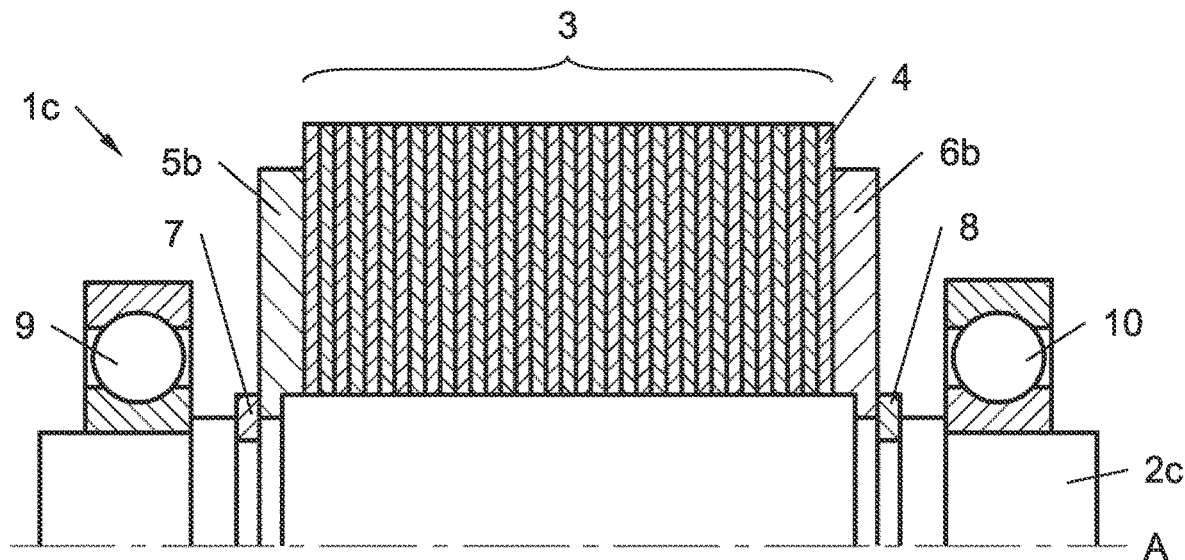
FIG. 3 shows a rotor for an electrical machine, in which rotor the rotor laminated core is axially secured by two shaft securing rings, which sit on a shaft projection.

At very high speeds of the electrical machine, the shaft securing rings 7, 8 may lift off or become detached from the shaft diameter of the rotor shaft 2c, on which shaft diameter the rotor laminated core 3 sits. For this reason, it may be expedient to arrange the shaft securing rings 7, 8—as illustrated in FIG. 3—on a further shaft projection of the rotor shaft 2c with a smaller diameter. The lift-off speed is raised owing to this measure, but it should be ensured that the shaft securing rings 7, 8 can dissipate the axial forces that occur, in spite of the diameter of reduced size. Furthermore, the rotor holders 5b, 6b are slightly offset on the inside, so that the rotor laminations 4 can sit securely on the central part of the rotor shaft 2c and cannot slip down from it.

Figure 4:
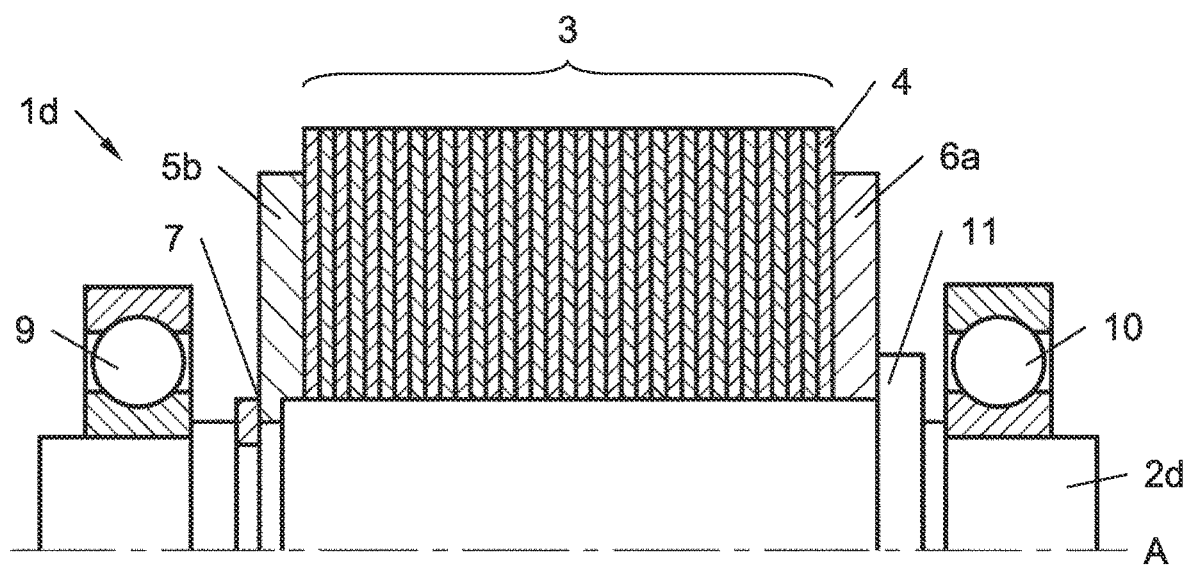
FIG. 4 shows a rotor similar to that in FIG. 3, but in which the rotor laminated core is axially secured by a shaft securing ring and a shaft shoulder of the rotor shaft.

FIG. 4 once again shows a slightly modified rotor 1d which is very similar to the rotor 1c illustrated in FIG. 3 and differs in that, instead of the second shaft securing ring 8, a shaft shoulder 11, on which the second rotor holder 6a is supported, is provided. The shaft shoulder 11 is arranged on the rotor shaft 2d adjacent to the second rotor holder 6a and opposite the rotor laminated core 3. The second rotor holder 6a does not need to be offset in this case.

Figure 5:
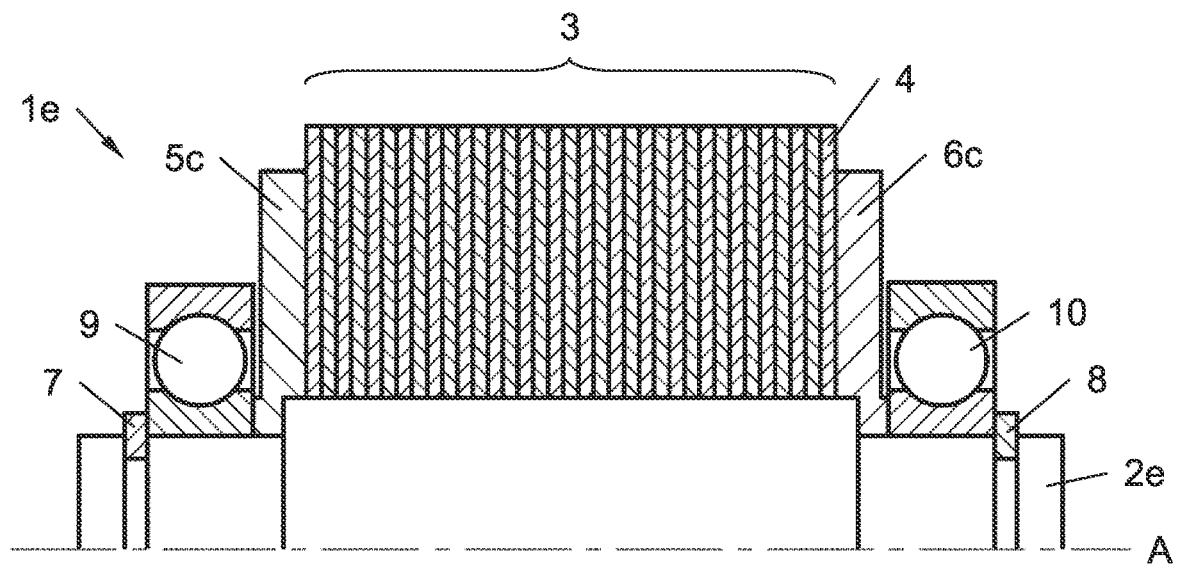
FIG. 5 shows a rotor for an electrical machine, in which rotor the rotor laminated core is axially secured together with the rolling bearings of the rotor by two shaft securing rings.

FIG. 5 shows a rotor 1e, in which the inner rings of the rolling bearings 9, 10 are axially secured together with the rotor laminated core 3. In this case, the inner ring of the first rolling bearing 9 is arranged adjacent to the first rotor holder 5c opposite the rotor laminated core 3, wherein the first shaft securing ring 7 is arranged on the outside of the inner ring of the first rolling bearing 9. Similarly, the inner ring of the second rolling bearing 10 is arranged adjacent to the second rotor holder 6c opposite the rotor laminated core 3, wherein the second shaft securing ring 8 is arranged on the outside of the inner ring of the second rolling bearing 10. The second rolling bearing 10 is arranged opposite the first rolling bearing 9 with respect to the rotor laminated core 3—as in the other previously illustrated embodiments too. Owing to the proposed measures, a multiple function is achieved. Firstly, both the rotor laminated core 3 and the rolling bearings 9, 10 are axially secured, and secondly the shaft securing rings 7, 8 sit on relatively small diameters, as a result of which the lift-off speed of said shaft securing rings is raised. This design is also particularly compact. Since the inner rings of the rolling bearings 9, 10 are axially fixed with this design, a floating bearing which may be required can be implemented by means of the outer ring of one of the rolling bearings 9, 10.

FIG. 6 once again shows a slightly modified rotor 1f which is very similar to the rotor 1e illustrated in FIG. 5 and differs in that, instead of the second shaft securing ring 8, a shaft shoulder 11, on which the second rotor holder 6d is supported, is provided once again. The shaft shoulder 11 is arranged on the rotor shaft 2f adjacent to the second rotor holder 6d and opposite the rotor laminated core 3.

Figure 6:
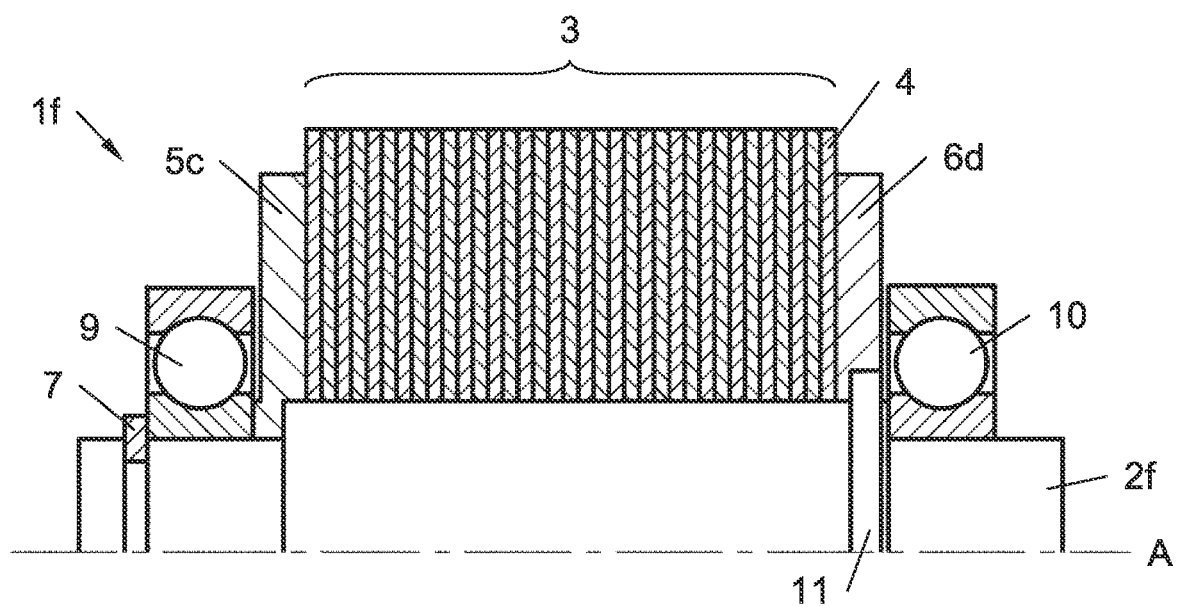
FIG. 6 shows a rotor similar to that in FIG. 5, but in which the rotor laminated core is axially secured by a shaft securing ring and a shaft shoulder of the rotor shaft.
Figure 7:
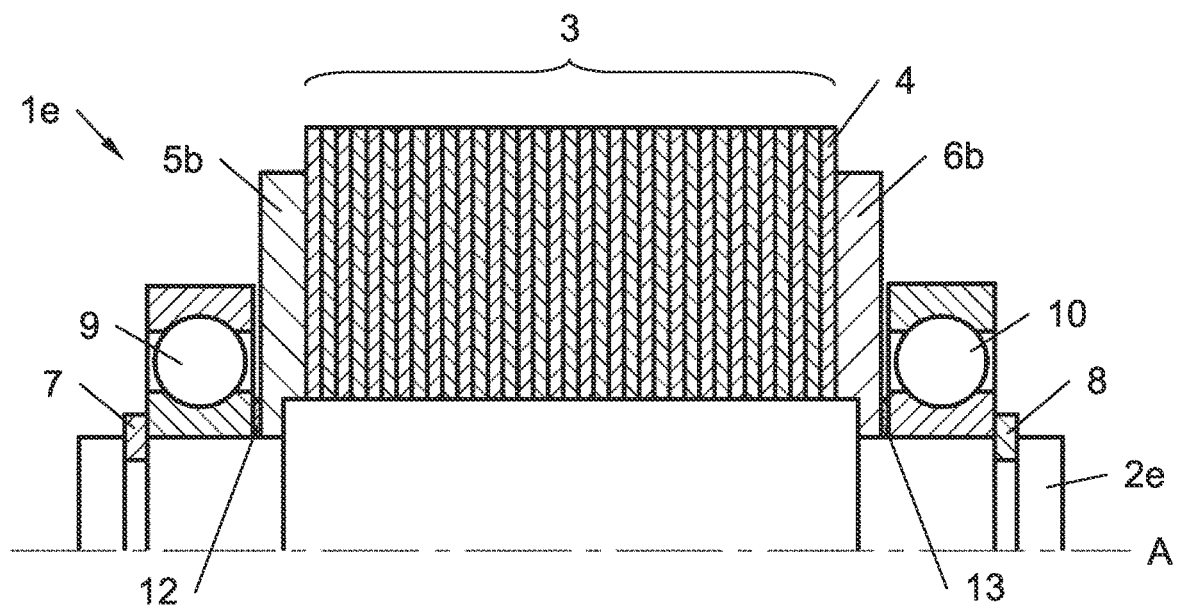
FIG. 7 shows a rotor similar to that in FIG. 5, but with spacer discs between the rotor holders and the rolling bearings.

In the embodiments shown in FIGS. 5 and 6, the rotor holders 5c, 6c project somewhat at their inner ends which face the rolling bearings 9, 10, so that the outer rings of the rolling bearings 9, 10 are released and can rotate freely. This is advantageous but is not a necessary condition. Instead of this, a first spacer disc 12 or spacer sleeve can be provided between the inner ring of the first rolling bearing 9 and the first rotor holder 5b, and a second spacer disc 13 or spacer sleeve can be provided between the inner ring of the second rolling bearing 10 and the second rotor holder 6b, as illustrated in FIG. 7.

Figure 8:
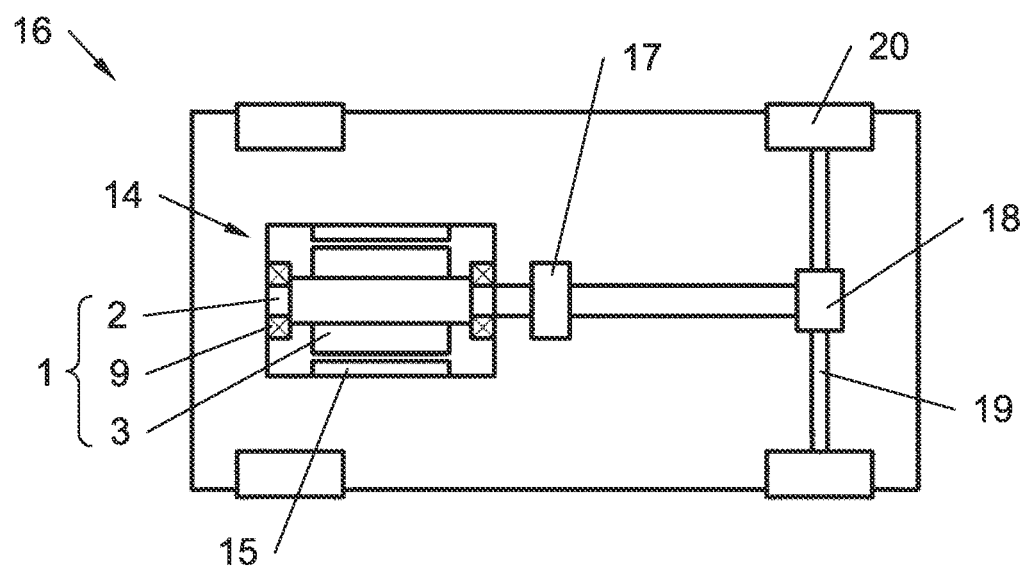
FIG. 8 shows an electrical machine comprising a rotor of the proposed type, which electrical machine is installed in a vehicle.

Finally, FIG. 8 shows an electrical machine 14 comprising a stator 15 and the rotor 1 which is mounted such that it can rotate about the rotation axis A and with the aid of the rolling bearings 9, 10 in relation to the stator 15. In this example, the electrical machine 14 (i.e. the electric motor) is installed in a vehicle 16 which has at least two axles, at least one of which is driven. Specifically, the electric motor 14 is connected to an optional gear mechanism 17 and a differential gear mechanism 18. The half-axles 19 of the rear axle adjoin the differential gear mechanism 18. Finally, the driven wheels 20 are mounted on the half-axles 19. Driving of the vehicle 16 is performed at least partially or temporarily by the electrical machine 14. That is to say, the electrical machine 14 can serve for sole driving of the vehicle 16 or can be provided, for example, in conjunction with an internal combustion engine (hybrid drive).

Finally, it is noted that the scope of protection is determined by the patent claims. However, the description and the drawings can be used to interpret the claims. The features contained in the figures can be interchanged and combined with one another as desired. In particular, it is also noted that in reality the devices shown can also comprise more or else fewer constituent parts than shown. In some cases, the devices illustrated or the constituent parts thereof can also be shown in a manner not true to scale and/or increased in size and/or reduced in size.

LIST OF REFERENCE SIGNS 1, 1a . . . 1f Rotor
2, 2a . . . 2f Rotor shaft
3 Rotor laminated core
4 Rotor lamination
5a . . . 5c First rotor holder
6a . . . 6d Second rotor holder
7 First shaft securing ring
8 Second shaft securing ring
9 First rolling bearing
10 Second rolling bearing
11 Shaft shoulder
12 First spacer disc
13 Second spacer disc
14 Electrical machine
15 Stator
16 Vehicle
17 Gear mechanism
18 Differential gear mechanism
19 Half-axle
20 Wheel
A Rotor axis

The invention claimed is:

1. A rotor for an electrical machine, comprising:
a rotor shaft;
a rotor laminated core, which sits on the rotor shaft with a press fit;
a first rotor holder, which is arranged adjacent to the rotor laminated core on a first side thereof, and a second rotor holder, which is arranged adjacent to the rotor laminated core on a second, opposite side thereof;
a first shaft securing ring, which sits in a first groove of the rotor shaft and axially secures the rotor laminated core; and
a first bearing, an inner ring of which is arranged adjacent to the first rotor holder opposite the rotor laminated core, wherein the first shaft securing ring is arranged on an outside of the inner ring of the first bearing.

2. The rotor according to claim 1, further comprising a second shaft securing ring which sits in a second groove of the rotor shaft and axially secures the rotor laminated core, wherein the second groove is arranged opposite the first groove with respect to the rotor laminated core.

3. The rotor according to claim 1, further comprising a shaft shoulder on the rotor shaft, which shaft shoulder is arranged adjacent to the second rotor holder opposite the rotor laminated core and axially secures the rotor laminated core.

4. The rotor according to claim 1, wherein the first shaft securing ring and the first groove are arranged adjacent to the first rotor holder opposite the rotor laminated core, and/or the second shaft securing ring and the second groove are arranged adjacent to the second rotor holder opposite the rotor laminated core.

5. The rotor according to claim 1, wherein the first shaft securing ring and/or the second shaft securing ring are/is arranged on a shaft projection of the rotor shaft.

6. The rotor according to claim 1, further comprising a second bearing, the inner ring of which is arranged adjacent to the second rotor holder opposite the rotor laminated core, wherein the second shaft securing ring is arranged on the outside of the inner ring of the second bearing and wherein the second bearing is arranged opposite the first bearing with respect to the rotor laminated core.

7. The rotor according to claim 1, further comprising a first spacer disc or spacer sleeve between the inner ring of the first bearing and the first rotor holder, and/or a second spacer disc or spacer sleeve between the inner ring of the second bearing and the second rotor holder.

8. An electrical machine comprising:
   a stator;
   a rotor according to claim 1 which is mounted such that it can rotate about the rotation axis of the rotor in relation to the stator.

9. A vehicle with at least two axles, at least one of which is driven, wherein said driving is performed at least partially or temporarily by the electrical machine according to claim 8.

\* \* \* \* \*